United States Patent [19]

Golant et al.

[11] Patent Number: 4,532,155
[45] Date of Patent: Jul. 30, 1985

[54] APPARATUS AND PROCESS FOR COATING, GRANULATING AND/OR DRYING PARTICLES

[75] Inventors: Victor Golant, Chicago; David Hsia, Libertyville; William Taylor, Jr., Chicago, all of Ill.

[73] Assignee: G. D. Searle & Co., Skokie, Ill.

[21] Appl. No.: 679,796

[22] Filed: Dec. 10, 1984

Related U.S. Application Data

[63] Continuation of Ser. No. 520,946, Aug. 8, 1983, abandoned.

[51] Int. Cl.³ ............................ B05D 7/00; B05D 1/02
[52] U.S. Cl. .................................. 427/213; 34/57 E;
118/19; 118/20; 118/303; 118/DIG. 5;
422/140; 427/346; 427/425
[58] Field of Search .................. 34/57 A, 57 B, 57 E;
118/DIG. 5, 19, 20, 303; 422/139, 140;
427/346, 213, 425

[56] References Cited

U.S. PATENT DOCUMENTS

| | | | |
|---|---|---|---|
| 3,494,047 | 2/1970 | Geiger et al. | 34/57 E |
| 3,671,296 | 6/1972 | Funakoshi et al. | 427/213 X |
| 3,822,140 | 7/1974 | Gyarmati et al. | 118/303 X |
| 3,908,045 | 9/1975 | Alterman et al. | 427/213 |

Primary Examiner—Michael R. Lusignan
Attorney, Agent, or Firm—Mark I. Feldman

[57] ABSTRACT

A fluidized bed apparatus and method are disclosed for coating, granulating and/or drying particles. The particles are circulated within a chamber by means of circumferential air flow. A first gas stream moves upwardly through the chamber. A second gas stream enters the chamber through openings in the side wall of the chamber. The openings extend generally horizontally and tangential to the side wall so that the second gas is directed circumferentially in the chamber for three-dimensional rotation and circulation of the particles.

12 Claims, 4 Drawing Figures

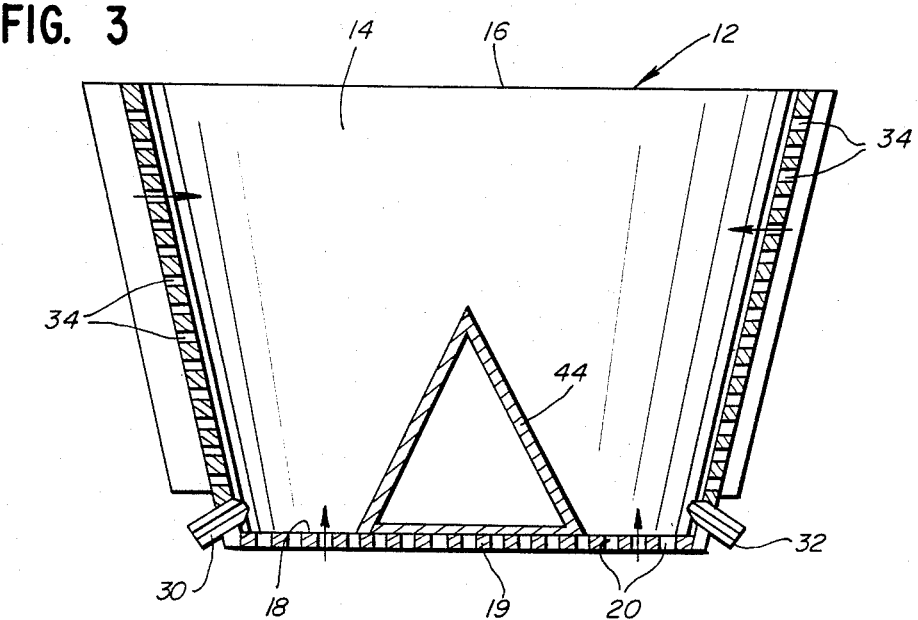
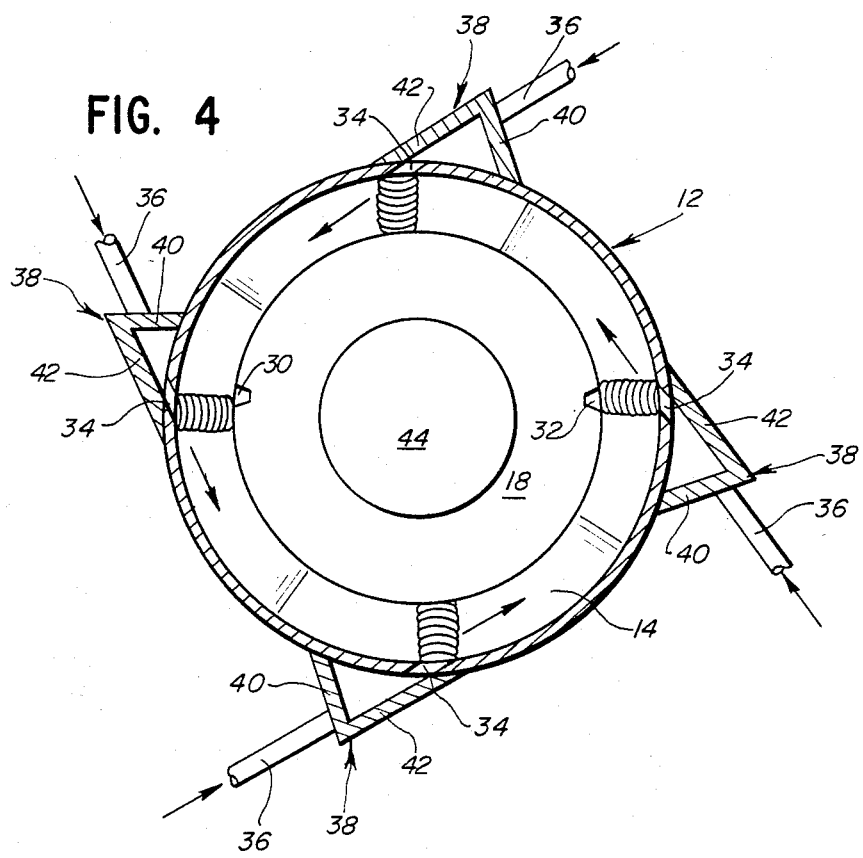

APPARATUS AND PROCESS FOR COATING, GRANULATING AND/OR DRYING PARTICLES

This is a continuation of application Ser. No. 06/520,946, filed Aug. 8, 1983, now abandoned.

FIELD OF THE INVENTION

The present invention relates to a fluidized bed apparatus and method and, more particularly, to an apparatus and process for coating, granulating and/or drying particles.

BACKGROUND OF THE INVENTION

A fluidized bed apparatus is used for making medicaments. The medicament starts as a bead which is coated with conventional additional materials within a mixing cylinder. By controlling the particle size distribution and the amount and nature of the particles, the final product can be provided with sustained release properties. The final product typically weighs two to six times the initial wieght of the bead.

Conventional fluidized bed apparatuses employ mechanical stirring devices, such as rotating blades, on the bottom of the mixing cylinder for maintaining the beads in continuous rotational movement. Adhesive and powder are delivered by spray or other means into the mixing cylinder. The beads become coated with the adhesive and grow in size by picking up the powder which will stick to the adhesive.

The use of mechanical stirring devices, such as blades, is disadvantageous because the blade breaks up some of the beads, is difficult to clean (which can result in cross contamination between product batches and down time for cleaning), the effectiveness of the blade is impaired when particles, adhesive, and powder build up thereon, and there is a risk of explosion from sparks.

Alterman U.S. Pat. No. 3,908,045 does not use mechanical stirrers. It employs a fluidizing gas that enters the vessel from beneath the mixing cylinder. In addition, a small amount of tangential air is supplied through a series of nine tubing jets that are equally spaced about the inner perimeter at the support screen level. The "function of the air jets is to help provide uniform particle coating by preventing any stagnant bed areas from forming at the wall" (column 7, lines 10-13).

Prior art patents with mechanical stirring devices include Funakoshi et al U.S. Pat. No. 3,671,296. It discloses an apparatus in which granules are charged into a receptacle and the dish is rotated by a motor, causing circulation of the granules about the axis of rotation. Centrifugal force pushes the granules outwardly and upwardly, and coating materials are applied to the circulating granules. Dry air is then blown into the receptacle and through the coated granules. Dry air is fed through an air inlet provided on the bottom of the receptacle and through vent holes and a ventilation gap.

Irikura et al U.S. Pat. No. 3,711,319 discloses a process for coating particles in which hot air is blown in below a horizontally rotating disk and is guided upwardly between a coating tower and the periphery of the disk. Particles of powder to be coated are supplied into the tower above the disk, and coating materials are sprayed into a flowing fluidized bed of the particles developed by the upward flow of air above the disk and the centrifugal force of the disk. This is also disadvantageous by requiring a mechanical stirring device.

SUMMARY OF THE INVENTION

The foregoing disadvantages of the prior art are overcome in accordance with the method and apparatus of the present invention which eliminates the use of internal mechanical parts by using air flow from two separate sources.

The apparatus for coating particles comprises a vertically extending round tower having a side wall extending between a top end and a bottom end. The apparatus includes means for moving a flow of a first gas into the bottom end of the tower and generally vertically and upwardly through the tower. Particles to be coated are released into the moving flow of said first gas for suspending the particles in the flow. Means is also provided for feeding into the tower a coating material containing a liquid, with or without solids, for coating the particles.

The side wall defines a plurality of openings that extend generally horizontally and generally tangential to the side wall. A second gas introduced into the tower through the openings, whereby the second gas is directed circumferentially in the tower for three-dimensional rotation and circulation of the particles to evenly coat the particles and for evaporating the liquid from the coating material on the particles.

The process for coating particles, in accordance with the present invention, comprises the steps of providing a stationary vertically extending round tower having a side wall extending between a top end and a bottom end, introducing a first gas into the bottom end of the tower, flowing said first gas generally vertically and upwardly through said tower, introducing particles into said tower for coating, said particles being suspended in the flow of the first gas, feeding a coating material containing a liquid into the tower for coating the particles, introducing a second gas into the tower through the side wall from a plurality of locations, and directing the second gas into the tower generally horizontally and circumferentially for three-dimensional rotation and circulation of the particles to evenly coat the particles and for evaporating the liquid from the coating material on the particles.

It is a feature of the present invention that it eliminates the use of internal mechanical parts for maintaining the particles suspended during the coating process by utilizing air flow from two sources which can be separate or common. The first source of air is directed upwardly from the bottom of the mixing cylinder for maintaining the particles suspended in air. The second source of air comprises a generally horizontal and circumferential air flow that is directed from ports around the mixing cylinder. The circumferential air flow provides directional movement to the beads and provides the additional advantage of facilitating the dispersion of the particles, the adhesive coating solution, and the coating material, thereby improving the quality of the finished product. The circumferential air provides more of a three-dimensional rotation of the particles for obtaining a desirable spherical shape for the finished product. There is a further advantage that the second air source causes the beads to be continuously dried, even while they are being coated, for improved product and process.

BRIEF DESCRIPTION OF THE DRAWINGS

FIG. 3 is a cross-sectional view taken along line 3—3 in FIG. 2; and

FIG. 4 is a cross-sectional view taken along line 4—4 in FIG. 2.

DETAILED DESCRIPTION OF THE PREFERRED EMBODIMENT

Figure 1:
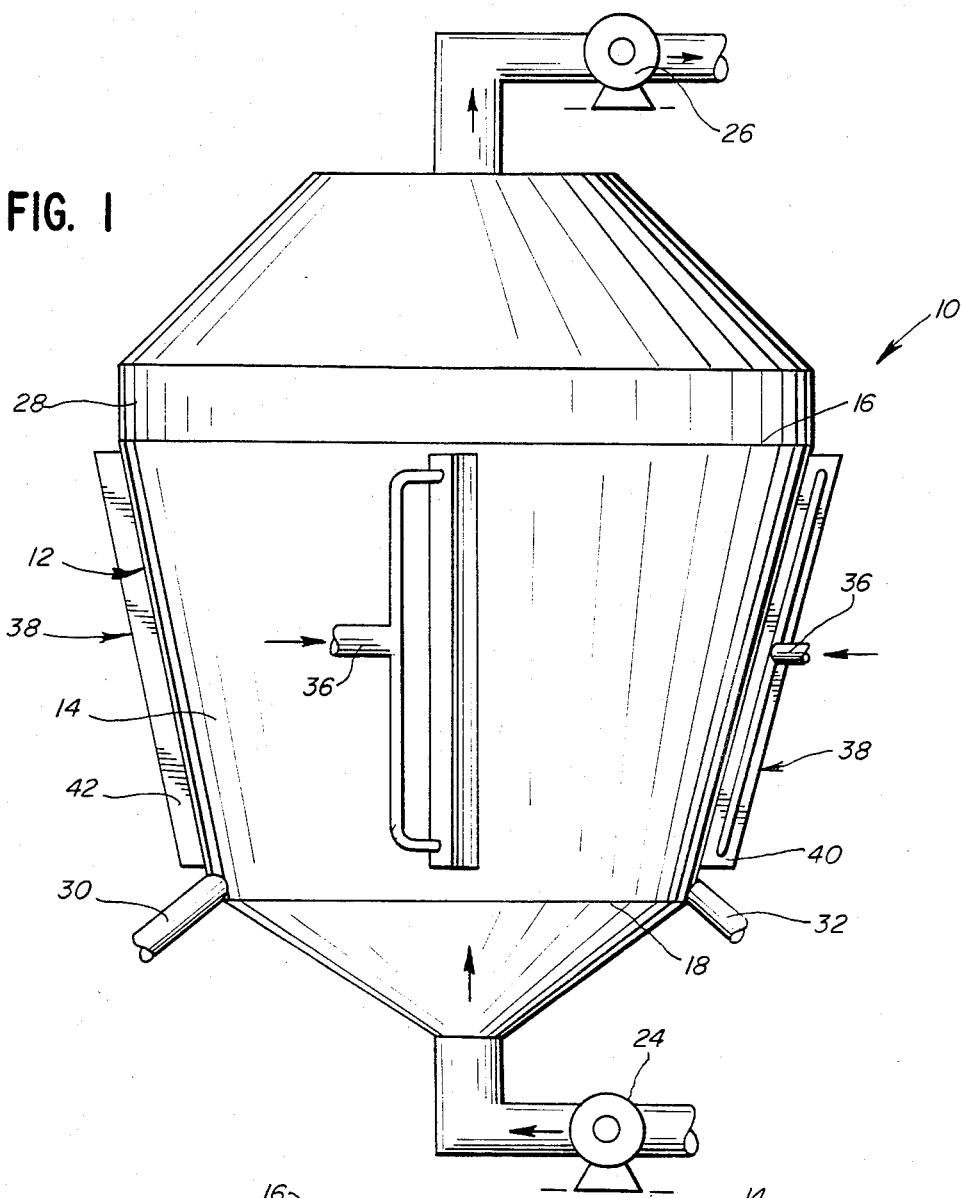
FIG. 1 is a front elevational view of the apparatus of the present invention.

While this invention is susceptible of embodiment in many different forms, there is shown in the drawings and will herein be described in detail one specific embodiment, with the understanding that the present disclosure is to be considered as an exemplification of the principles of the present invention, and is not intended to limit the invention to the emobodiment illustrated.

Referring now to the drawings, FIG. 1 shows a fluidized bed apparatus 10 that includes a stationary vertically extending round tower or chamber 12 that has a side wall 14 extending between a top end 16 and a bottom end 18. The side wall 14 is tapered conically in downward direction. A fine mesh screen 19 with perforations 20 is seated in the bottom end 18 of the chamber 12, as depicted in FIG. 3.

A plurality of solid particles or beads of the material to be treated are initially positioned in the tower, supported by the screen 19. The perforations 20 have a smaller diameter than the beads and enable air to pass upwardly through the screen 19, while preventing the beads from falling downwardly through the screen. The treatment of the beads can either be granulation, coating, or drying.

The beads are conveyed in upward direction by a rising gas or air stream that is generated by blower 24 or 26 (FIG. 1). Atmospheric air, or another gas, can be used. Filter means 28 is provided above the chamber 12, and prevents the beads from leaving the chamber.

The apparatus includes an upwardly and inwardly projecting nozzle 30 constituting a spraying means which is adjustably disposed within the chamber. The nozzle provides liquid droplets of coating material which are discharged for coating the beads.

As in the formation of sustained release pharmaceutical products, it may be desirable to start with a bead nucleus and have the bead grow in size with the addition of both a liquid coating material and a solid medicament. The medicaent may be mixed with or dissolved in the liquid coating material. Alternatively, a second nozzle 32 may be provided for delivery of fine powdered medicament into the chamber. The powdered medicament becomes attached to the beads which are coated with the liquid spray, thereby building the size of the beads. The nozzles 30 and 32 preferably are disposed adjacent the bottom end of the side wall 14, but can be positioned elsewhere.

In accordance with the present invention, means in provided for circulating the beads and moving them with three-dimensional rotation and for evaporating the liquid from the beads, without the use of moving mechanical parts. This is accomplished by means of a second source of air or other gas.

Figure 2:
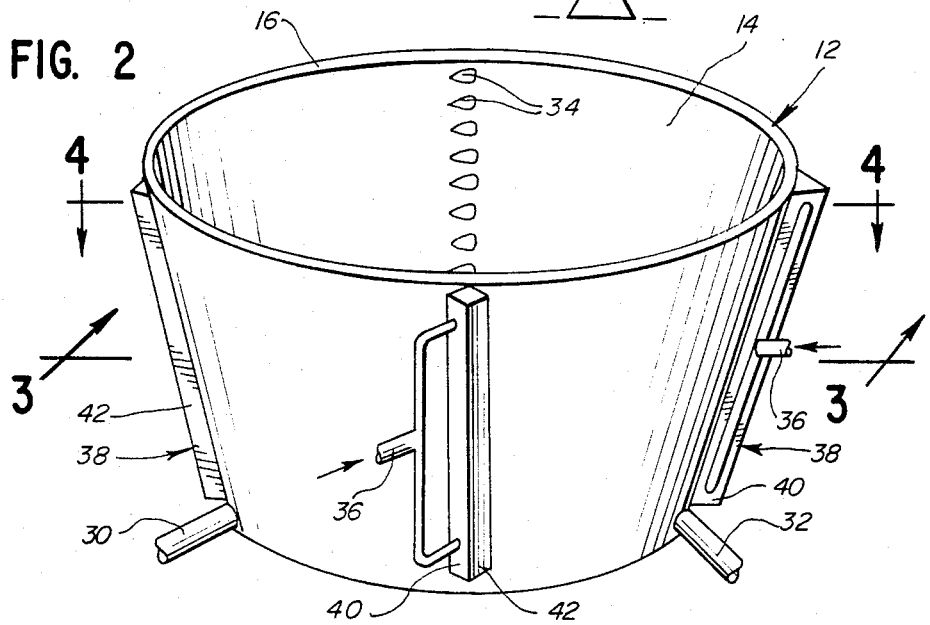
FIG. 2 is an isometric view of a portion of the apparatus illustrated in FIG. 1.

Referring to FIGS. 2 and 3, the side wall 14 of the tower defines a plurality of openings 34 that extend generally horizontally and generally tangential to the side wall. The openings can be spaced throughout the area of wall 14. In one embodiment, a series of openings 34 extends vertically along the side wall, preferably extending all of the way from the bottom end 18 to the top end 16. For example, at least two sets of openings are provided, with four sets being preferred, as shown in FIG. 4.

The configuration of the openings 34 is best illustrated in FIG. 4. The second source of air that is provided through the openings 34 is desired for providing circumferential flow of air and, concomitantly, the beads, in the chamber 12. Thus, the openings in the side wall of the tower are positioned generally horizontally (FIG. 3) through the side wall, and are made through the side wall at an angle (FIG. 4) so that the axis of the opening is generally tangential to the side wall 14. By this, it is meant that the axis of the opening should not exceed an angle of 30 degrees relative to the tangent of the side wall. In the illustrated embodiment, the second source of air moves the beads through the chamber in a counterclockwise direction.

The circumferential air flow provided by the second source of air provides several advantages. First, it provides directional movement to the beads by means of a cylcone or vortex effect, circulating and rotating the beads three-dimensionally so that they are evenly coated. This avoids the problem of non-spherical particles and particles with pin-holes. It also facilitates the dispersion of the coating material and powder to further improve product quality. In addition, the circumferential air acts to evaporate liquid from the coating material on the beads, even during the coating process, thereby speeding the time for manufacturing the product. Further, the circumferential air not only acts to keep particles off the side wall 14 of the tower, but also maintains the particles suspended in air, thereby preventing them from settling on the screen 19 at the bottom of the chamber. Moreover, the movement of the beads is accomplished without any mechanical parts moving within the chamber.

A plurality of sets of openings, at least two, preferably four or more, are desired for propelling the solid particles and maintaining circulation in the chamber.

The circumferential air is provided by hoses 36, each of which communicates with a compartment 38 that is defined by a pair of walls that are sealingly secured to the outside surface of the side wall 14. The compartment is defined by a rear wall 40 and a side wall 42 that preferably ae flat, and the compartment is enclosed at the top and the bottom. In order to provide direction to the air that enters through the openings 34, the side wall 42 of the compartment preferably is generally tangential to the side wall of the tower, being disposed at an acute angle of less than 30° relative to the tangent of the side wall at the location of the opening 34.

Each compartment extends vertically for about the length of the chamber 12, for providing air to all of the openings in one of the vertical sets of openings. In operation, the beads are disposed throughout the chamber 12 when both sources of air are entering the chamber. The compartments 38 and openings 34 extend vertically for a major portion of the height of the side wall, preferably for about the entire side wall height, to maximize the affect of the second source of air on the beads.

A process for coating particles in accordance with this invention includes the steps of providing a stationary vertically extending round chamber having a side wall extending between a top end and a bottom end, introducing a first gas into the bottom end of said chamber, flowing said first gas generally vertically and upwardly thrugh said chamber, introducing particles into said chamber for coating, said particles being suspended in the flow of said first gas, feeding a coating material containing a liquid into said chamber for coating said particles, introducing a second gas into said chamber through said side wall from a plurality of locations, and directing said second gas into said chamber generally horizontally and circumferentially for three-dimensional rotation and circulation of said particles to evenly coat said particles and for evaporating the liquid from the coating material on said particles.

After the particles reach a desired size, the feeding of coating materials through nozzles 30 and 32 can be terminated. The flow of second gas is continued for drying and moving the coated beads. After the coated beads have dried, the flow of all gas is terminated and the beads can be removed from the chamber through door means (not shown).

Alternatively, after the coated beads have dried, it may be desired to repeat the steps of feeding the coating materials, introducing the second gas, and drying the beads, in order to form beads that have favorable sustained release properties.

Coated beads manufactured in accordance with this invention can be made in about 6-7 hours. If it is desired to add a second coating on the beads for timed or sustained release properties, a second coating and drying step is required, and the total manufacturing time is about 9-12 hours, by way of example.

The hoses 36 can all communicate with a single source through a manifold (not shown) for the air that enters through the openings 34. The air which enters the tower through the openings 34 is exhausted by the blower 26. Atmospheric air can be used for both sources of air.

Referring to FIG. 3, a cone 44 can be centrally positioned on the screen 19 in the chamber. The cone provides desired shape to the path of the moving particles and air.

From the foregoing, it will be observed that numerous variations and modifications may be a effected without departing from the true spirit and scope of the novel concept of the invention. It is to be understood that no limitation with respect to the invention illustrated and described herein is intended or should be inferred. It is, of course, intended to cover by the appended claims all such modifications as fall within the scope of the claims.

We claim:

1. An apparatus for coating particles comprising a vertically extending round tower having a side wall extending between a top end and a bottom end,
   means for moving a flow of a first gas into the bottom end of said tower and generally vertically and upwardly through the tower,
   means for releasing particles to be coated into said moving flow of said first gas for suspending the particles in said flow,
   means for feeding into said tower a coating material containing a liquid for coating the particles,
   said side wall defining a plurality of openings that extend generally horizontally and generally tangential to said side wall, said side wall having at least some of said openings spaced from said bottom end,
   moving means for moving said particles circumferentially in said tower for three-dimensional rotation and circulation of substantially all of said particles and for evaporating same of said liquid from the coating material on substantially all of said particles, for maintaining substantially all of said particles suspended in said tower above said bottom end, and for dispersing said coating material,
   said moving means comprising means for introducing a second gas into said tower through said openings in said side wall generally horizontally and generally tangentially to said side wall.

2. Apparatus as defined in claim 1 wherein said side wall defines openings that are disposed at an angle of no more than 30 degrees relative to the tangent of said wall.

3. Apparatus as defined in claim 1 wherein said particles are initially supported by the bottom end of said tower.

4. Apparatus as defined in claim 1 wherein said plurality of openings extends vertically along a major portion of the height of said side wall.

5. Apparatus as defined in claim 4 wherein at least two sets of vertical openings are defined by said side wall.

6. Apparatus as defined in claim 1 wherein said coating material includes a powder.

7. Apparatus as defined in claim 1 wherein means is provided for feeding a powdered coating material.

8. A process for coating particles, comprising the steps of providing a stationary vertically extending round tower having a side wall extending between a top end and a bottom end,
   introducing a first gas into the bottom end of the tower,
   flowing said first gas generally vertically and upwardly through said tower,
   introducing particles into said tower for coating, said particles being suspended in the flow of said first gas,
   feeding a coating material containing a liquid into said tower for coating the particles,
   introducing a second gas into said tower through said side wall from a plurality of locations with at least some of said locations spaced above said bottom end,
   directing said second gas into said tower generally horizontally and circumferentially,
   dispersing said coating material by means of said second gas,
   rotating substantially all of said particles three-dimensionally and circulating substantially all of said particles by means of said second gas to evenly coat said particles with said coating material, and
   evaporating some of the liquid from the coating material on substantially all of said particles by means of said second gas.

9. A process as defined in claim 8 including the step of feeding a powdered coating material into said tower.

10. A process as defined in claim 8 including the steps of terminating the feeding of coating material after said particles have grown to a predetermined size, continuing the flow of said first and second gas for drying said coated particles, terminating said flow of said first and second gas after said particles have dried, and removing said dry coated particles from said tower.

11. Apparatus as defined in claim 1 wherein said openings are positioned along a major portion of the height of said side wall.

12. A process as defined in claim 8 including the step of introducing a second gas into said tower through said side wall from a plurality of locations along a major portion of the height of said side wall.

* * * * *